United States Patent [19]
Kirkpatrick

[11] Patent Number: 4,740,891
[45] Date of Patent: Apr. 26, 1988

[54] ASYNCHRONOUS STATE MACHINE

[75] Inventor: Donald C. Kirkpatrick, Beaverton, Oreg.

[73] Assignee: Tektronix, Inc., Beaverton, Oreg.

[21] Appl. No.: 730,920

[22] Filed: May 6, 1985

[51] Int. Cl.[4] .............................................. G06F 9/00
[52] U.S. Cl. ...................................... 364/200; 328/75; 340/825.5; 364/140; 364/141; 364/143; 370/91
[58] Field of Search ... 364/200 MS File, 900 MS File, 364/140, 141, 143; 328/75; 340/825.5; 370/60, 91

[56] References Cited

U.S. PATENT DOCUMENTS

| | | | |
|---|---|---|---|
| 4,167,789 | 9/1979 | Faustini | 364/900 |
| 4,390,969 | 6/1983 | Hayes | 364/900 |
| 4,562,427 | 12/1985 | Ecton | 340/825.5 |
| 4,633,489 | 12/1986 | Morishita | 370/91 |
| 4,663,545 | 5/1987 | Pumo et al. | 307/463 |

Primary Examiner—Gareth D. Shaw
Assistant Examiner—Joseph T. Fitzgerald
Attorney, Agent, or Firm—Boulden G. Griffith; Francis I. Gray; John P. Dellett

[57] ABSTRACT

An asynchronous state machine waits a variable length of time after first detecting a change in input state before initiating a machine state change, the new machine state being a function of the previous machine state and the input state at the end of the waiting time, thereby allowing multiple, non-simultaneous input changes to occur during said waiting time without initiating intermediate state changes. The waiting time is a function of the current state of the machine. One state variable of a set characterizing the current state of the machine indicates whether the current state is an interim state in a sequence of states occurring after an input state change. Following a machine state change, this sequencing state variable initiates a subsequent state change, in the absence of any further input state changes, when the sequencing state variable associated with the current machine state indicates that the current machine state is such an interim state of a sequence of states.

10 Claims, 3 Drawing Sheets

ASYNCHRONOUS STATE MACHINE

BACKGROUND OF THE INVENTION

The present invention relates in general to digital logic devices and in particular to an asychronous state machine permitting multiple input change and sequenced outputs.

The next state of a state machine is a function of the current state of the machine together with current states of any externally generated inputs. Digital logic state machines are typically characterized by a state register, for storing data representing the current state of the machine, and a block of combinational logic for generating the data representing the next state of the machine based on the combination of applied inputs and the current state data stored in the state register. The next state data is applied to the input of the state register and the machine "changes state" when a clock pulse applied to the gate control of the state register causes it to replace the stored current state data with the output data from the combinational logic block. Digital state machines are often used as programmable control devices with the current state data being used to control external events and with the input data being generated by sensing devices.

In a "synchronous" state machine, the clock pulse applied to the gate control of the state register is generated independently of the input changes (usually periodically) and input changes are permitted only during certain intervals between the clock pulses. In an "asychronous, single input change" state machine, the clock pulses are generated following detection of an input change, rather than independent of input changes. Only one input signal may change at a time and consecutive input changes must be separated by the minimum time required for the machine to change state in response to the changed input. In an "asychronous, multiple input change" state machine, the clock pulse is also generated following detection of an input change but a group of several input signals may change within an interval of duration $D_1$ and be treated as "simultaneous" input events for purposes of effecting a state change, provided that such groups are separated by the minimum time ($D_2$) required for the machine to change state in response to the changed inputs.

It follows that the theoretical minimum possible time between changes in a multiple input asynchronous state machines is $D_1+D_2$. However, in the prior art, due to the nature of the mechanisms for generating the clocking pulses, a cycle must be at least as long as $1.5D_1$ (or more in some designs) when the last input change occurs as long as $D_1$ after the first. Since in many applications $0.5D_1$ is much greater than $D_2$, the latter practical constraint often degrades system performance.

In multiple change input asychronous state machines of the prior art, the inputs are applied to a change detector which produces a signal on detection of a state change in any of the inputs. This signal is then delayed by a delaying circuit and then applied to the state register as the clocking signal. The clocking signal is also fed back to the change detector to turn off the state change signal. The clocking pulse is delayed after detection of the first input change by a fixed delay time, proportional to $D_1$, which must be sufficient to allow for the worst case multiple input situation wherein the the last input change is expected to occur the longest time after the first. However, the fixed delay time may be longer than necessary to allow for multiple input changes as may occur when the machine is in other states. Since the state machine cycle time is related to the fixed delay time, the state change cycle time of the prior art state machines is dependent only on the worst case state change situation. Therefore if any one state change requires a very long cycle time, all other state changes require a similar long cycle time and the system speed is further degraded.

Sometimes it is desirable that an input change initiate a sequence of output state changes, rather than to simultaneously initiate a set of events. However, since the clocking of the state changes occurs only on a change in input states, only the first machine state of the sequence could be reached. In the prior art this problem was solved by feeding back the current state of the state machine to the input change detector such that changes in output state would result in subsequent state changes even in the absence of any change in input states. However this approach further degrades system speed by requiring the system to cycle one extra time for each sequence or isolated state change such that the machine state stabilizes.

SUMMARY OF THE INVENTION

According to one aspect of the invention, a multiple input change asynchronous state machine comprises a state register, for storing data representing the most recent state of the machine, and a combinational logic circuit for generating data representing the next state of the machine based on the combination of applied external event input data and the current state data stored in the state register. The state machine also comprises an asynchronous timing circuit which detects changes in the input data and then initiates a clock pulse applied to the gate control of the state register, whereby the state register replaces the current state data with the next state data generated by the combinational logic circuit. The clock pulse is delayed after detection of the first input change by a delay time having a variable portion determined by the maximum expected time between the first and last input changes occurring during the current machine state.

According to another aspect of the invention, the combinational logic circuit of the state machine maps not only the combination of current machine state and current input state onto the next machine state variable, but also maps the current machine state onto a delay time variable associated with the maximum temporal separation of multiple input changes expected while the machine is in the current state. This delay time variable is then applied to the asynchronous timing circuit to control the variable portion of the clock pulse delay. This aspect of the invention permits the clock pulse delay time associated with each state to be adjusted for each state, rather than to be preset at the maximum, worst case time, thereby permitting the shortest possible state change time between any two states.

According to a further aspect of the invention, the next state data of the machine generated by the combinational logic circuit includes a one bit sequencing variable. This variable is applied as another input to the change detector through an interfacing logic device which changes output state if the sequencing variable is a logical 1 and which retains the same output state if the sequencing variable is a logical 0. The variable is set by the combinational logic circuit to a 1 whenever another machine state is to follow the current state without an input change. The sequencing variable is set to a 0 whenever no further machine state changes are to occur without a change in input state. Therefore the output of the interfacing logic device changes state whenever the state machine enters an interim state of a sequence of states to occur after a single input state change. The logic device output is applied as an input to the timing circuit and any change of state therein is detected by the timing circuit which then initiates another machine state change. Such machine state changes continue without input changes until the last state of a sequence is reached. This aspect of the invention permits sequenced state changes without degrading system performance by requiring one additional state change cycle to determine if the end of every state change sequence has been reached.

It is accordingly an object of the present invention to provide and new and improved asynchronous state machine wherein the time required to change states is minimized for each state change.

It is another object of the present invention to provide a new and improved asynchronous state machine capable of performing sequenced machine state changes in response to a single input state change without initiating an additional state change cycle at the end of each sequence.

The subject matter of the present invention is particularly pointed out and distinctly claimed in the concluding portion of this specification. However, both the organization and method of operation, together with further advantages and objects of the present invention, may best be understood by reference to the following description taken in connection with accompanying drawings wherein like reference characters refer to like elements.

DRAWINGS

FIG. 1 is a block diagram of an asynchronous state machine according to the present invention, FIG. 2 is a partial state diagram of the operation of a typical state machine, FIG. 3 is a block diagram of an embodiment of the asynchronous timing circuit of FIG. 1, FIG. 4 is a block diagram of a detailed embodiment of the change detector of FIG. 3, FIG. 5 is a block diagram of a detailed embodiment of the delay circuit of FIG. 3, and FIG. 6 is a timing diagram showing the temporal relation of various waveforms is may occur in the state machine of FIGS. 1 and 3.

DETAILED DESCRIPTION

Figure 1:
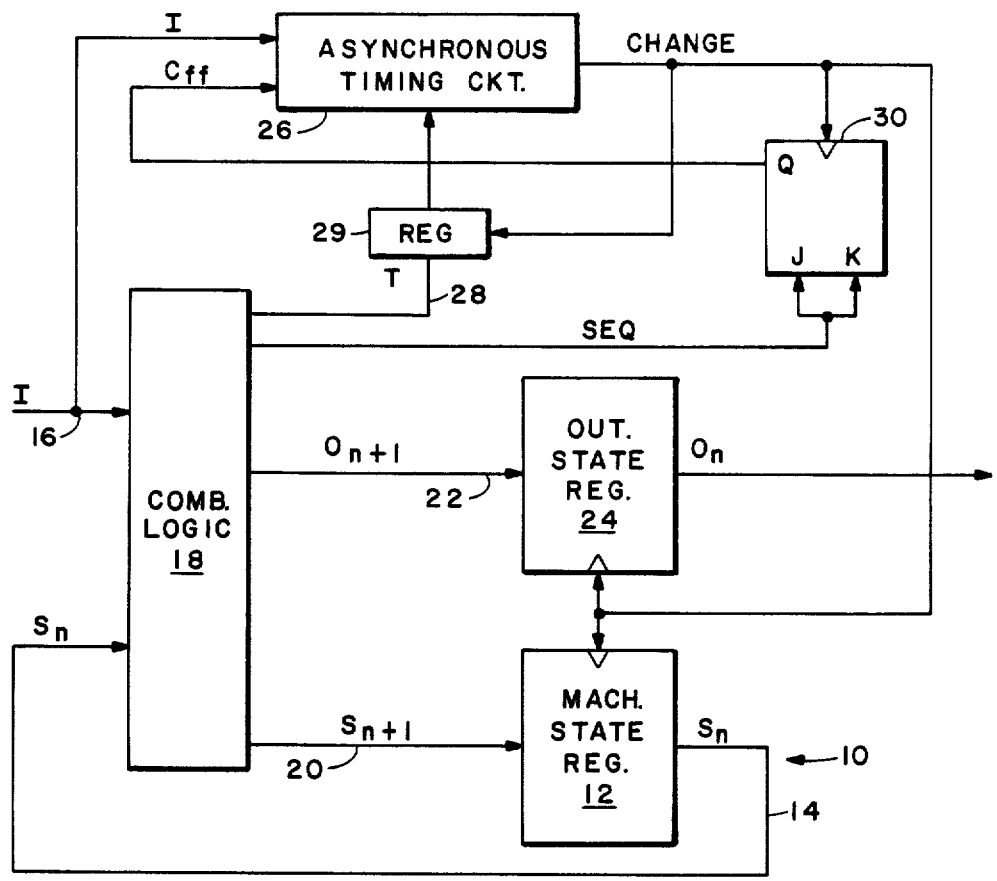

Referring to FIG. 1, an asynchronous state machine 10, illustrated in block diagram form, is adapted to change to a selected new machine state ($S_{n+1}$) in response to a change in input state (I) during a current machine state ($S_n$), $S_n=1$ being therefore a function of both I and $S_n$ or, $$S_{n+1}=f(S_n,I)$$

In the preferred embodiment, the current machine state $S_n$ comprises a binary number stored in a machine state register 12 of state machine 10, each bit of $S_n$ representing a binary machine state variable. Each bit of state register 12 appears on a separate line of state register output bus 14. Similarly, input state I also comprises a binary number, each bit thereof representing a binary input variable and appearing on a separate line of input bus 16.

Output bus 14 and input bus 16 are both applied as inputs to combinational logic circuit 18. Combinational logic circuit 18 may be any device capable of generating the appropriate $S_{n+1}$ outputs derived from the $S_n$ and I inputs, including a suitable arrangement of logic gates, a read only memory, or a suitably programmed digital computer system. In the preferred embodiment, however, combinational logic circuit 18 comprises a random access memory (RAM) wherein $S_n$ and I are applied to address the RAM and wherein the $S_{n+1}$ output comprises data stored by the RAM such that when any possible combination of $S_n$ and I address the RAM, the appropriate $S_{n+1}$ appears at the data output bus 20 of combinational logic circuit 18.

In addition to machine state variable $S_{n+1}$, combinational logic circuit 18 may also generate output variable $O_{n+1}$ according to the function $$O_{n+1}=g(S_n,I).$$

Each $O_{n+1}$ is stored at the same RAM location as the corresponding $S_{n+1}$ and appears on output data bus 22 at the same time $S_{n+1}$ appears on output data bus 20.

Data bus 20 is connected to the input gate terminals of state register 12 such that whenever the clock terminal of state register 12 is strobed by a CHANGE pulse, the contents of data bus 20, $S_{n+1}$, are stored in state register 12 as $S_n$ on the trailing edge of such pulse, thereby advancing the state of state machine 10 by one step. Similarly data bus 22 is connected to the input gate terminals of an output state register 24 such that whenever the clock terminal of register 24 is strobed by the CHANGE pulse, the contents of data bus 22, $O_{n+1}$, are stored in register 24 as $O_n$. The new selected variables of $S_n$ or $O_n$ may both be used to control external events. However only the state variables comprising $S_n$ are fed back to the input of combinational logic circuit 18. Therefore, $O_n$ comprises all the state variables not fed back to the input of combination logic circuit 18.

The CHANGE pulse is generated by asynchronous timing circuit 26. Timing circuit 26 monitors the input state I of state machine 10 appearing on bus 16, applied to the input of timing circuit 26, and generates a CHANGE pulse to advance the state of the machine upon detecting a change in I, after a suitable delay time. The time delay is necessary, in part, to allow combinational logic circuit 18 enough time to generate a new $S_{n+1}$ output in response to a change in I. The access cycle time of logic circuit 18 is designated $D_2$.

The time delay associated with timing circuit 26 is also necessary to ensure that the change in I is complete prior to strobing registers 12 and 24. State machine 10 is a multiple input change state machine wherein several of the binary variables of I may change over a time interval, designated $D_1$, and still be treated as occurring "simultaneously" for purposes of determining the next state of the machine. Consequently, timing circuit 26 must wait for a period of at least $t=D_1+D_2$ after detecting the first change in any variable of I before generating the CHANGE pulse to advance the state of the machine.

Figure 2:
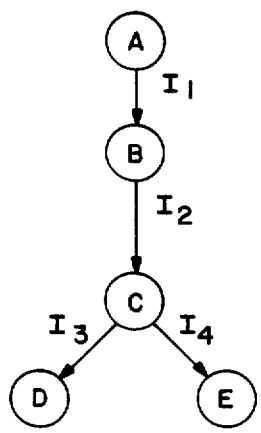

In most applications, the minimum waiting time $D_1$, necessary to ensure that the change in I is complete, may differ depending on the current state $S_n$ of the machine. Referring to FIG. 2, there is depicted a typical state diagram. Assuming the machine is initially in state $S_n = A$, the machine changes to state B on occurrence of input state $I_1$. Due to the nature of the problem that the machine is designed to solve, it is known that once in state B, the machine may change only to state C, and may change to state C only on occurrence of input state $I_2$. Assuming that input state $I_2$ is only one bit different from input state $I_1$, and that the input can only change from state $I_1$ to $I_2$, then waiting time D1 is zero since the change in I is complete instantly upon occurrence of the first change of a bit thereof. Alternatively, when the machine is in state C, and waiting for input state $I_3$ to advance to state D or for input state $I_4$ to advance to state E, $I_3$ and $I_4$ may have several bits different than $I_2$ and there may be a considerable delay between the first bit change and the last bit change. Also $I_3$ an $I_4$ may have only one bit different, and that bit may be the last to change. Therefore the waiting time $D_1$ between the first and last changed bits in I while the machine is in state C is nonzero and may be relatively large. In complicated systems there may be a wide variety of waiting times $D_1$ depending on the present state of the machine.

In the prior art, timing circuit 26 of FIG. 1 had a fixed internal delay time $D_1 + D_2$ such that $D_1$ was at least as large as the longest waiting time $D_1$ expected for any state. This fixed delay time $D_1$ slowed machine response because the asynchronous state machines of the prior art waited for a time $D_1 + D_2$ to advance the machine state, $D_1$ being a large fixed valve even when in some states $D_1$ could be very small or zero. The present invention provides for a timing circuit 26 wherein multiple input change waiting time $D_1$ is variable, rather than fixed, changing with the present state $S_n$.

Accordingly, combination logic circuit 18 of FIG. 1 generates an additional binary number output variable T on data bus 28 to register 29. The T variable is clocked into register 29 on receipt of a CHANGE pulse from timing circuit 26 and is then applied to timing circuit 26. This variable T, which may be a function of $S_n$ or, alternatively, a function of $S_n$ and I, is used to alter the time delay $t = D_1 + D_2$ of timing circuit 26, depending on the current state $S_n$ of the machine. Consequently, any change in $S_n$ forces combinational logic circuit 18 to generate an appropriate change in T whereby the time delay $D_1$ is set to the minimum necessary for proper operation in the current state, thereby facilitating the fastest possible state advance from each machine state.

State machine 10 is further adapted to permit a sequence of machine state $S_n$ and output state $O_n$ changes following a single input I state change. In the prior art, this was accomplished by feeding back $S_n$ as an input to timing circuit 26. A change in input state I would cause in an initial change in $S_n$. The initial change in $S_n$ would be perceived as an input change by timing circuit 26 which would then generate another CHANGE pulse to advance the state of the machine once again. The new state $S_n$, if different from the previous state, would force a third state change. The machine would continue to sequence from state to state until $S_n$ stops changing. In this prior art method, the last state advance is necessary to insure that the sequence is complete. Therefore every change in input state I results in at least two state advance cycles. In a case where most state changes are single stepped, and not part of a sequence, system performance is dramatically slowed because is takes twice as long for the machine to stabilize following an input state I change.

According to the present invention, a new single-bit state variable SEQ, which is a function of the current state $S_n$, is generated by logic circuit 18. When the sequence variable bit is a logical 1, it indicates that the current state $S_n$ is part of a sequence and that another state in the sequence is to follow until a change in input state I. If the sequence variable is a logical 0, this indicates that the current state $S_n$ is either not a part of a sequence or is the last state in a sequence of states, with no further states to follow without a change in input state I. The sequence variable is then applied to the J and K inputs of J-K flip-flop 30 which is clocked by the CHANGE pulse from timing circuit 26. If the sequence variable is a logical 1, the output of flip-flop 30 will change states on the trailing edge of a CHANGE pulse. If the sequence variable is a logical 0, the output of flip-flop 30 will not change states on receipt of a CHANGE pulse. The output of flip-flop 30, designated $C_{ff}$, is applied as an additional input to timing circuit 26.

When input I changes state, the state change is detected by timing circuit 26 which subsequently generates a CHANGE pulse to advance the state $S_n$ of the machine. If this state is the first of a sequence, the sequence state variable produced by logic circuit 18 will be a logical 1. Therefore, the falling edge of the CHANGE pulse arriving at flip-flop 30 will cause the output of flip-flop 30 to change state. Use of the falling CHANGE pulse edge ensures that state register 12 has stored the new $S_n$ prior to the clocking of flip-flop 30 and ensures that the asynchronous timing circuit 26 is ready to accept the output of flip-flop 30. This change of flip-flop output $C_{ff}$ state is detected by timing circuit 26, which issues a subsequent CHANGE pulse thereby initiating a second state advance in the sequence of $S_n$ states. The machine will continue to advance through the state sequence until it reaches the last state $S_n$ in the sequence, wherein the sequence variable is set to a logical 0. When this logical 0 is applied to the J and K inputs of the flip-flop 30, no change of state of flip-flop 30 output occurs on the falling edge of the CHANGE pulse. Therefore, no $C_{ff}$ input change is detected by timing circuit 26 and state machine 10 remains at rest until it detects a change in input state I. Thus in the present invention, the use of the sequence variable permits the state machine to come to rest immediately upon reaching the last state in a sequence without requiring an additional state advance cycle to determine if the end of the sequence has been reached.

Figure 3:
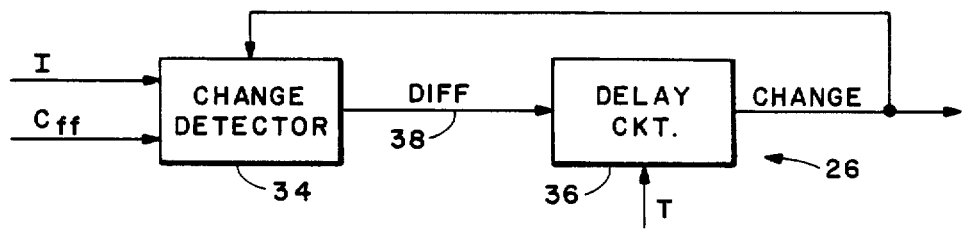

Referring now to FIG. 3, an embodiment of asynchronous timing circuit 26 of FIG. 1 depicted in in block diagram form comprises a change detector circuit 34 and a variable time delay circuit 36. Any change in input state I or in flip-flop 30 output state $C_{ff}$ is detected by change detector circuit 34 which then generates a logical 1 (high) output signal DIFF on line 38 coupled to the input of delay circuit 36. The DIFF signal stays high, regardless of any subsequent changes in I or $C_{ff}$, until change detector circuit 34 receives a high CHANGE signal generated by delay circuit 36. The output of delay circuit 36, the CHANGE signal, switches high a selected delay time after the DIFF input from change detector 34 goes high. As the CHANGE signal goes high, the DIFF output of change detector 34 is reset low to logical 0 (low) and stays low until change detector 34 detects a subsequent change in I or $C_{ff}$.

When the DIFF signal returns to 0, the CHANGE signal output of delay circuit 36 immediately goes to 0.

Therefore the CHANGE pulse generated by delay circuit 36 is relatively narrow, its width being determined by the resetting time of change detector 34 upon receipt of the leading edge of the CHANGE pulse, and the resetting time of delay circuit 36 on receipt of the trailing edge of the DIFF signal. In the prior art, using a topology similar to that depicted in FIG. 3, the delay circuit 36 delayed both the leading and trailing edges of the DIFF signal by the same, fixed, delay time, thereby extending the response time of the state machine. In the present invention, only the leading edge of the DIFF signal is delayed by the delaying circuit 36 and the trailing edge is not delayed. Further the leading edge delay time is variable, depending on the state of timing input variable T generated and transmitted to delay circuit 36 by combination logic circuit 18 of FIG. 1 as described hereinabove.

The delay of the leading edge of the DIFF signal is such that the trailing edge of the CHANGE pulse occurs at a time $$t = D_1 + D_2$$
$$= D_3 + D_4$$

after the leading edge of the the DIFF signal, where $D_1$ is the input I change waiting time as described above, $D_2$ is the cycle time of combinational logic circuitry 18 also as described above, $D_3$ is the variable delay in delaying circuit 36, and $D_4$ is the fixed pulse width of the CHANGE pulse. With the time $D_3$ appropriately controlled by the time variable T supplied by the logic circuitry 18, $D_4$ being fixed, the time t will be the minimum machine state $S_n$.

Figure 4:
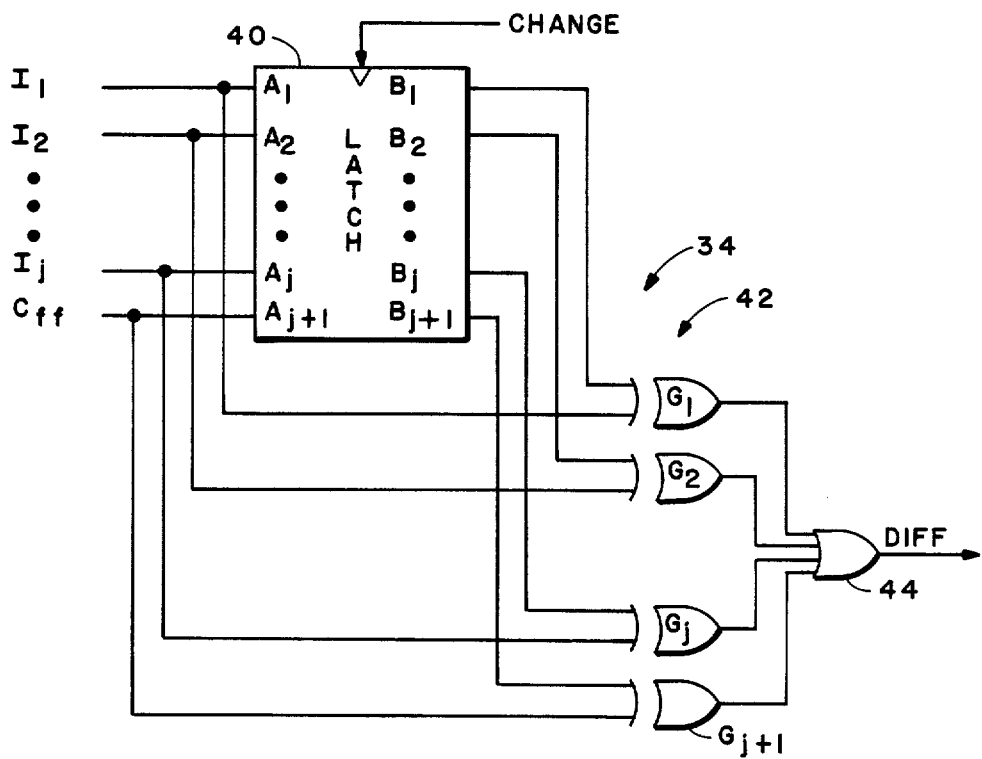

An embodiment of change detector circuit 34, depicted in FIG. 4 in block diagram form, comprises a $j+1$ bit latch circuit 40, a set of $j+1$ exclusive OR (XORn) gates 42, designated $G_1$ to $G_{j+1}$, and OR gate 44. The variable j is the number of binary state variables forming input state I. Each input variable $I_x$ is applied to the corresponding input $A_x$ of latch 40 and also to one input of corresponding XOR gate $G_x$. Similarly, the $C_{ff}$ variable from flip-flop 30 of FIG. 1 is applied to the $A_{j+1}$ input of latch 40 and also to one input of XOR gate $G_{j+1}$. Each output $B_x$ of latch 40 is applied to a second input of the corresponding XOR gate $G_x$ and every output of XOR gate 42 is connected to a separate input of OR gate 44. The CHANGE signal from delay circuit 36 controls the clock input of latch 40.

Latch 40 is of the type wherein the inputs are transferred to the outputs when the clock is high. The outputs remain fixed any time the clock is low. Thus when the CHANGE signal goes low the last states of I and $C_{ff}$ are stored in the latch and appear at outputs $B_x$ until the arrival of the leading edge of another CHANGE signal at the clock input. When a change occurs in any $I_x$ or in $C_{ff}$, the inputs of the corresponding XOR gate differ such that the output of the XOR gate switches to a logical 1 causing the output of OR gate 44, the DIFF signal, to go high as well. When the leading edge of the CHANGE signal arrives at the clock input of latch 40, the current states of $I_x$ and $C_{ff}$ are transferred to the output of the latch and applied through the $B_x$ output terminals of the latch to the corresponding XOR gate 42 inputs such that both inputs of every XOR gate are equal. This causes the output of every XOR gate to switch to 0, and thereby causes the DIFF output of OR gate 44 to also switch back to 0. Delay circuit 36 then drives the CHANGE signal low, thereby completing an input detection cycle and initiating a machine state change. Thereafter any subsequent change in I or $C_{ff}$ will initiate another detection cycle.

Figure 5:
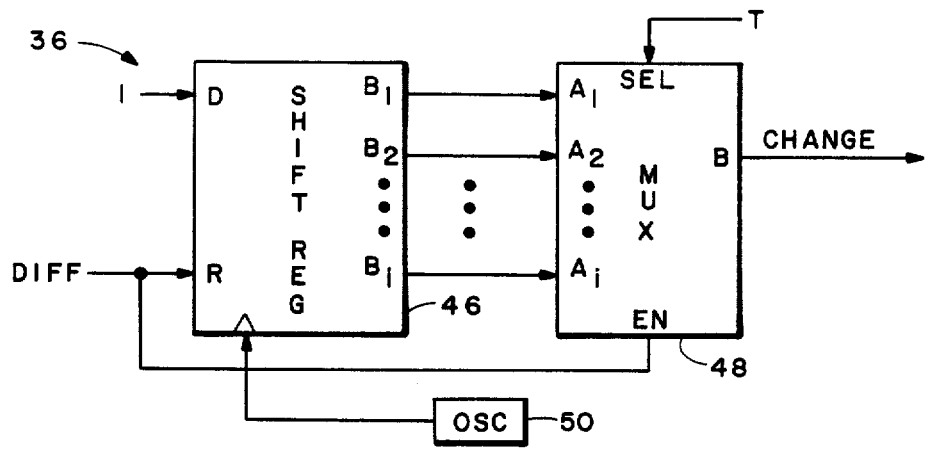

A more detailed embodiment of delay circuit 36 of FIG. 1, shown in block diagram form in FIG. 5, comprises an i-stage shift register 46, a multiplexer circuit 48 having i inputs, and oscillator 50. The DIFF signal is applied to the reset input (R) of shift register 46 while a logical 1 is applied to the data input (D). Shift register 46 is clocked by oscillator 50. The outputs of shift register 46, designated $B_1$ through $B_i$, are applied to the corresponding inputs $A_1$ through $A_i$ of multiplexer 48. The DIFF signal is also applied to the enable (EN) input of multiplexer 48 while the T variable from logic circuit 18 of FIG. 1 is applied to the switching control inputs of multiplexer 48.

Every output $B_x$ of shift register 48 is reset to 0 on receipt of the leading edge of a DIFF signal. Subsequently, on each clock cycle from oscillator 50, shift register 46 shifts the logical 1 applied to the data input terminal to successive outputs $B_x$ such that $B_1$ goes high on the first clock cycle after reset, $B_2$ goes high on the second clock cycle after reset and $B_x$ goes high on the Xth clock cycle after reset. The output B of multiplexer circuit 48, which comprises the CHANGE signal, is always low when the DIFF signal, applied to the enable input of the multiplexer, is low. When the DIFF signal goes high, the output B of the multiplexer circuit 48 reflects one selected input $A_x$, the selection being controlled by the variable T applied to the selection control inputs.

In the preferred embodiment, oscillator 50 operates at 100 mHz. Therefore successive outputs $B_x$ of shift register 46 go high 10 nSec apart. The variable delay time $D_3$ of delay circuit 36 is set by adjusting the value of T such that multiplexer 48 passes the appropriate $B_x$ output of shift register 46 to the output B of multiplexer 48. If the number of stages i of shift register 46 is 12, then delay time $D_3$ may range 10 to 120 nSec in steps of 10 nSec. The range and resolution of $D_3$ may be altered by changing the number i of shift register 46 stages and by adjusting the frequency of oscillator 50.

On receipt of the leading edge of a DIFF pulse, every output of shift register 46 is thus set to 0 and multiplexer 48 is enabled. Successive outputs $B_x$ of shift register 46 begin to go high on each cycle of oscillator 50. The CHANGE output of multiplexer 48 goes high after a selected time $D_3$, when the selected $A_x$ input from shift register 46 goes high. The CHANGE output signal then causes the change detector circuit 34 of FIG. 4 to reset the DIFF signal to 0. As the DIFF signal falls to 0, the shift register 36 is cleared and the enable input of multiplexer 48 goes to 0, thereby resetting to 0 the CHANGE output signal of multiplexer 48 to complete the change detection cycle and to initiate a machine state change.

Figure 6:
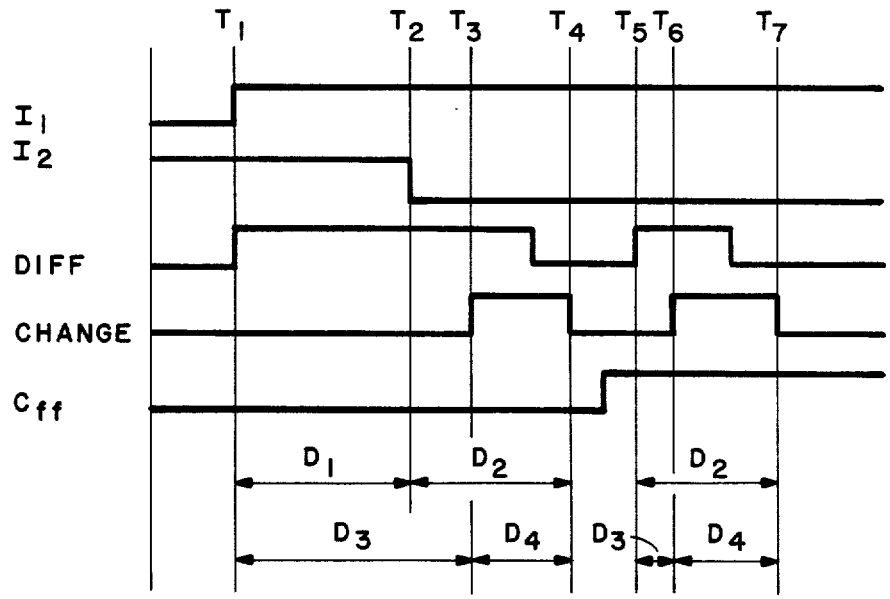

FIG. 6 is a timing diagram showing the temporal relationships between the I and $C_{ff}$ inputs to change detector 34 of FIG. 3, the DIFF signal, and the CHANGE signal. It is assumed that input state I is determined by the states of only two input state variables $I_1$ and $I_2$ and that $I_2$ changes state a maximum time $D_1$ after $I_1$ changes, both changes occurring within the same change detection cycle. It is also assumed that the first state $S_n$ following the change in I is the first state in a two step sequence.

The change detector 34 switches the DIFF signal high at time $T_l$ on detection of a change in $I_1$. At time $T_2$, after a maximum delay time $D_1$, input variable $I_2$ changes. At time $T_3$, after a delay time $D_3$ (determined by the T variable from logic circuit 18) between $T_1$ and $T_3$, the delay circuit 36 drives the CHANGE signal high, causing the DIFF signal to go low, thereby resetting the CHANGE signal to 0 at time $T_4$. This occurs after a delay of $D_4$ from the time the CHANGE signal went high.

The machine state is advanced at time $T_4$ on the falling edge of the CHANGE signal. Since the new state $S_n$ of the machine is the first state in a sequence, the sequencing variable is set to a logical 1. Therefore, a short time after the state change at $T_4$, the $C_{ff}$ variable from flip-flop 30 changes state causing the DIFF signal to go high again at time $T_5$. At time $T_4$ the $D_3$ timing control signal T from logic circuit 18 is changed such that the variable delay time $D_3$ associated with the delay circuit 36 is readjusted to reflect the requirements of the new machine state. In the example the new delay time $D_3$ is made small since $D_1$ is to be 0. At time $T_6$, after the small $D_3$ delay, the CHANGE signal goes high, driving the DIFF signal low. Finally, at time $T_7$, after the DIFF signal goes low, the CHANGE signal goes low once more causing the state machine to advance to the next state. Since the new state is the last state in the sequence, the sequence variable is 0. Therefore $C_{ff}$ does not change state and the machine remains at rest until the next change in input state I.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A state machine comprising:
   means for storing a current data set including a current machine state, a current output state, and a current timing state;
   means for generating a next data set, the next data set being a function of the current machine state and of a current input state; and
   means for monitoring the current input state and for producing a state change signal a variable time following a change in the current input state, said state change signal causing the storing means to store the next data set in place of the current data set, whereby said variable time is a function of the current timing state.

2. A state machine as recited in claim 1 wherein the generating means comprises an addressable memory device, the memory device being addressed by the current machine state and the current input state, and the next data set being stored at the location in memory so addressed.

3. A state machine as recited in claim 1 wherein the monitoring means comprises:
   means for detecting a change in the current input state and for outputtting a difference signal in response thereto and for stopping outputting the difference signal when the state change signal terminates; and
   means for initiating the state change signal the selected time after receiving the difference signal from the detecting means and for terminating the state change signal when the difference signal terminates, the initiating means having the current timing state as an input.

4. A state machine as recited in claim 3 wherein the detecting means comprises:
   a plurality of transparent latches having inputs and outputs to receive the current input state at the inputs and output a latched or current version of the inupt data at the outputs, with the oututs being latched during periods when the state change signal is inactive and the outputs tracking the inputs when the state change signal is active; and
   a plurality of exclusive OR gates to compare the inputs of the transparent latches with the outputs of the transparent latches; and
   an output gate to output the difference signal in response to differences between the inputs and the output of the transparent latches when such differences are detected by the exclusive OR gates.

5. A state machine as recited in claim 3 wherein the initiating means comprises:
   an oscillator;
   a shift register, the shift register being reset by the difference signal, and the shift register shifting a constantly asserted input signal in response to signals from the oscillator; and
   a multiplexer having the output of the shift register and the current timing state as inputs and producing the state change signal at an output when the input signal from the shift register reaches the value of the multiplexer input selected by the current timing state and terminating the state change signal when the differences signal on an enable input terminates.

6. A state machine comprising:
   means for storing a current data set including a current machine state, a current output state, a current timing state, and a sequence bit;
   means for generating a next data set, the next data set being a function of the current machine state and of a current input state;
   means for monitoring the current input state and a sequence signal and for producing a state change signal a variable time following a change in the current input state or sequence signal, said state change signal causing the storing means to store the next data set in place of the current data set, whereby said variable time is a function of the current timing state.
   means for determining the status of the sequence bit and for producing the sequence signal when the state change signal occurs and the sequence bit is set.

7. A state machine as recited in claim 6 wherein the generating means comprises an addressable memory device, the memory device being addressed by the current machine state and the current input state, and the next data set being stored at the location in memory so addressed.

8. A state machine as recited in claim 6 wherein the monitoring means comprises:
   means for detecting a change in the current input state or the sequence signal and for outputtting a difference signal in response thereto and for stopping outputting the difference signal when the state change signal terminates; and means for initiating the state change signal the selected time after receiving the difference signal from the detecting means and for terminating the state change signal when the difference signal terminates, the initiating means having the current timing state as an input.

9. A state machine as recited in claim 8 wherein the detecting means comprises:
   a plurality of transparent latches having inputs and outputs to receive the current input state data and the sequence signal at the inputs and output a latched or current version of the input data and the sequence signal at the outputs, with the outputs being latched during periods when the state change signal is inactive and the outputs tracking the inputs when the state change signal is active; and
   a plurality of exclusive OR gates to compare the inputs of the transparent latches with the outputs of the transparent latches; and
   an output gate to output the difference signal in response to differences between the inputs and the outputs of the transparent latches when such differences are detected by the exclusive OR gates.

10. A state machine as recited in claim 8 wherein the initiating means comprises;
   an oscillator;
   a shift register, the shift register being reset by the the difference signal, and the shift register shifting a constantly asserted input signal in response to signals from the oscillator; and
   a multiplexer having the output of the shift register and the current timing state as inputs and producing the state change signal at an output when the input signal from the shift register reaches the value of the multiplexer input selected by the current timing state and terminating the state change signal when the difference signal on an enable input terminates.

* * * * *